United States Patent Office 3,462,171
Patented Aug. 19, 1969

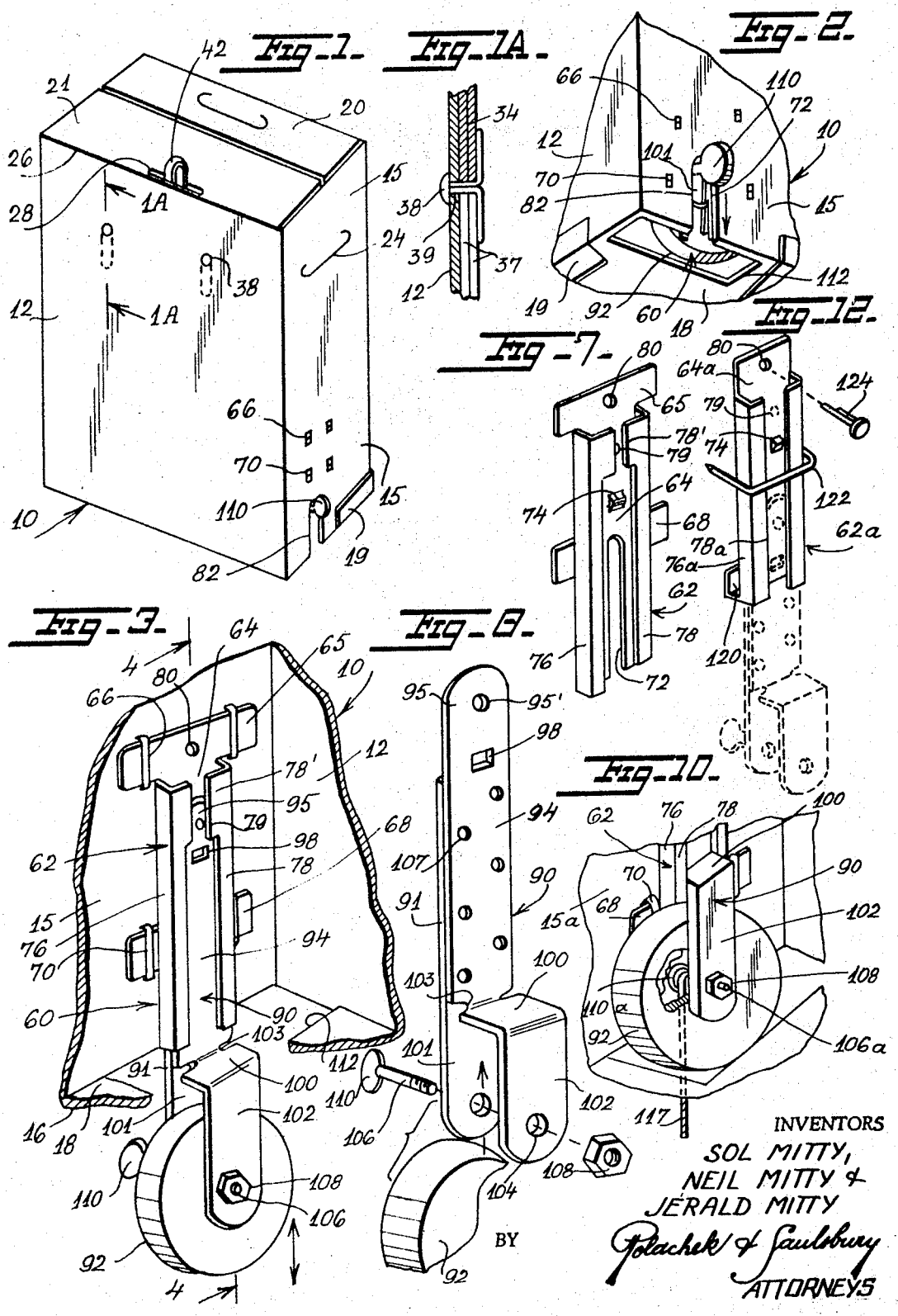

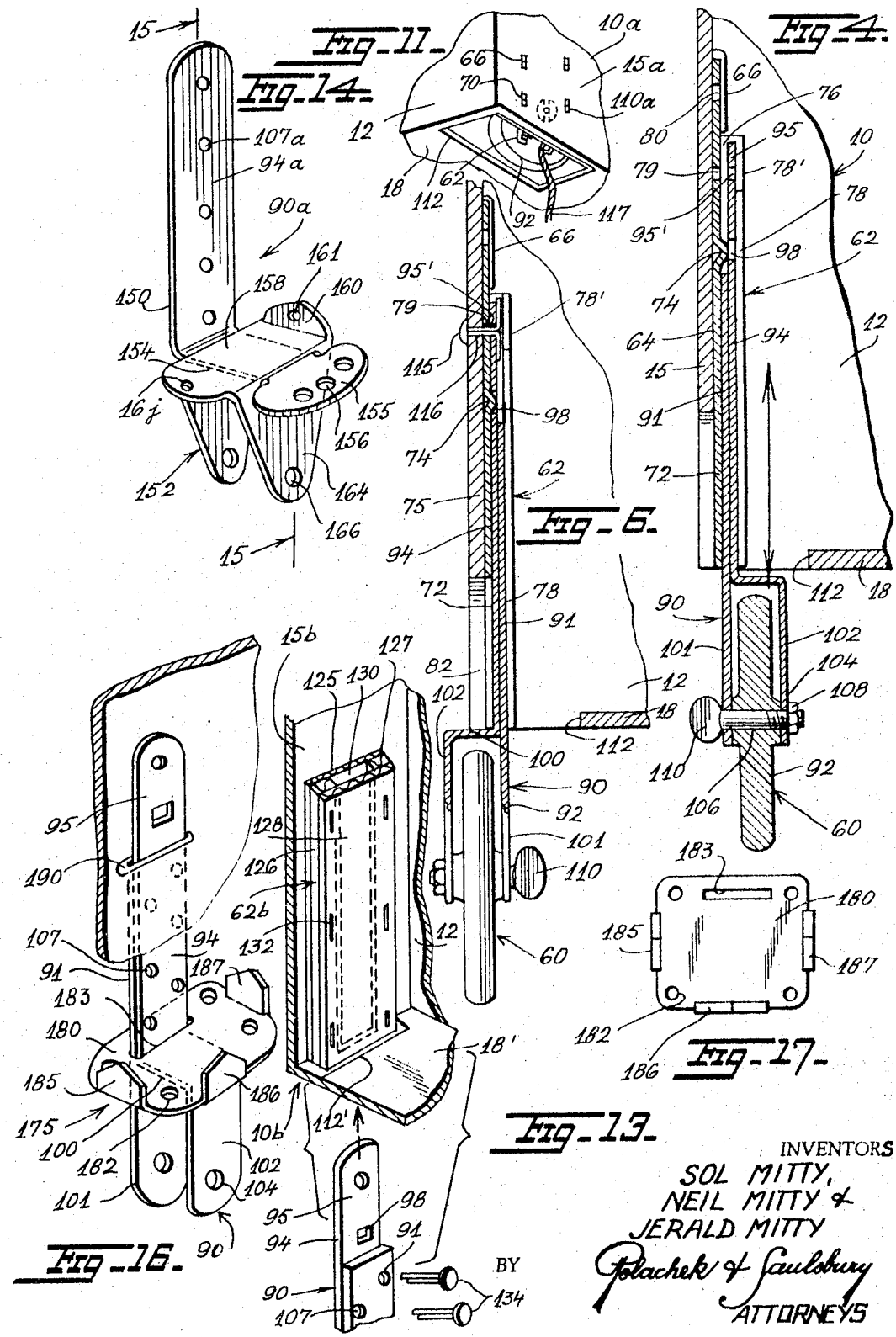

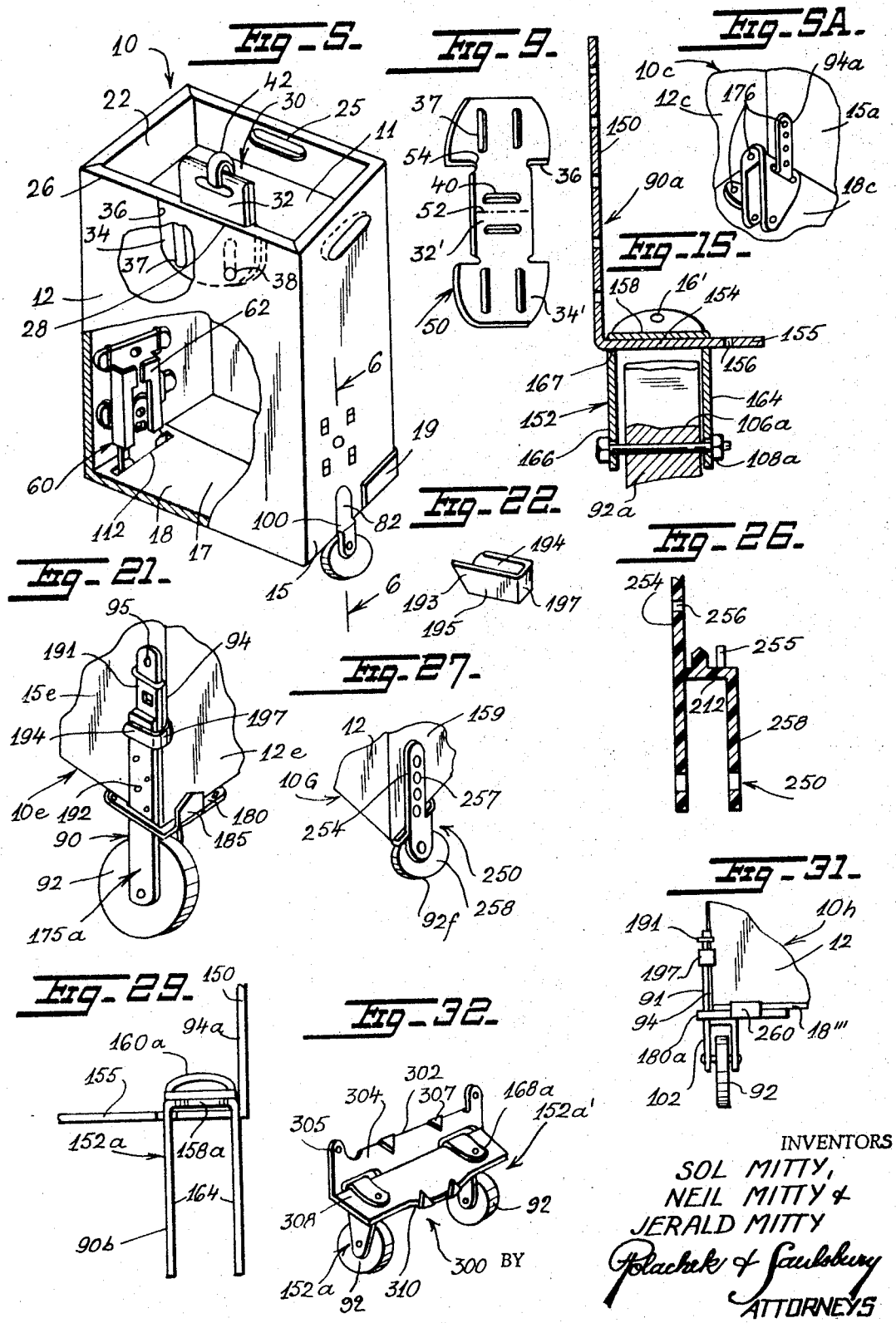

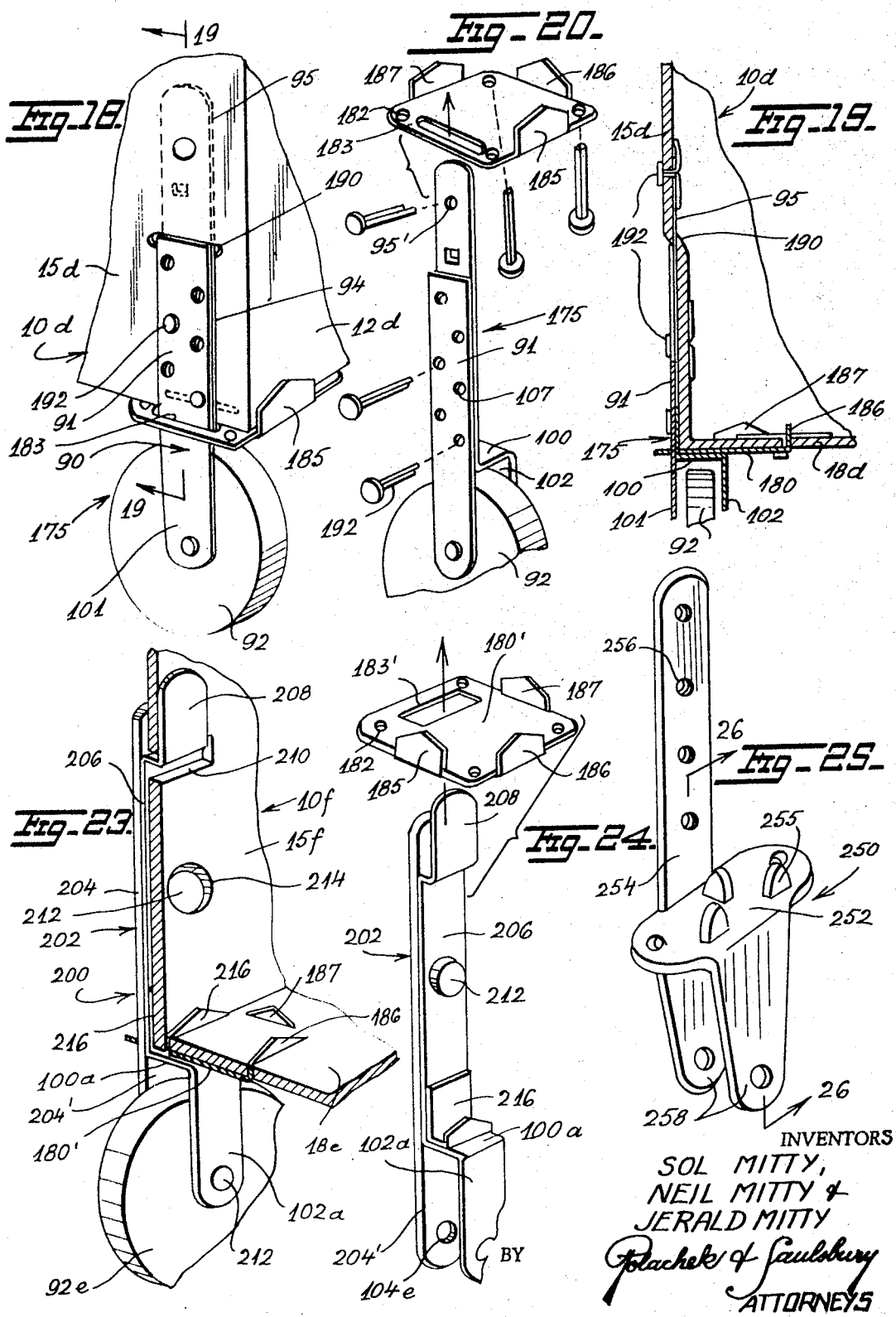

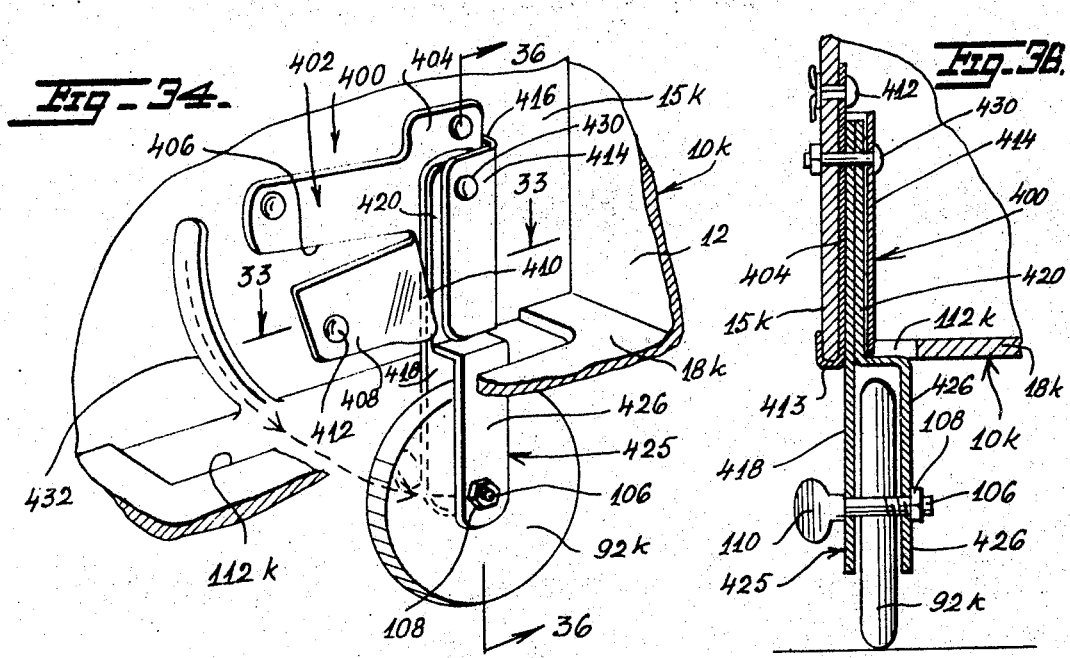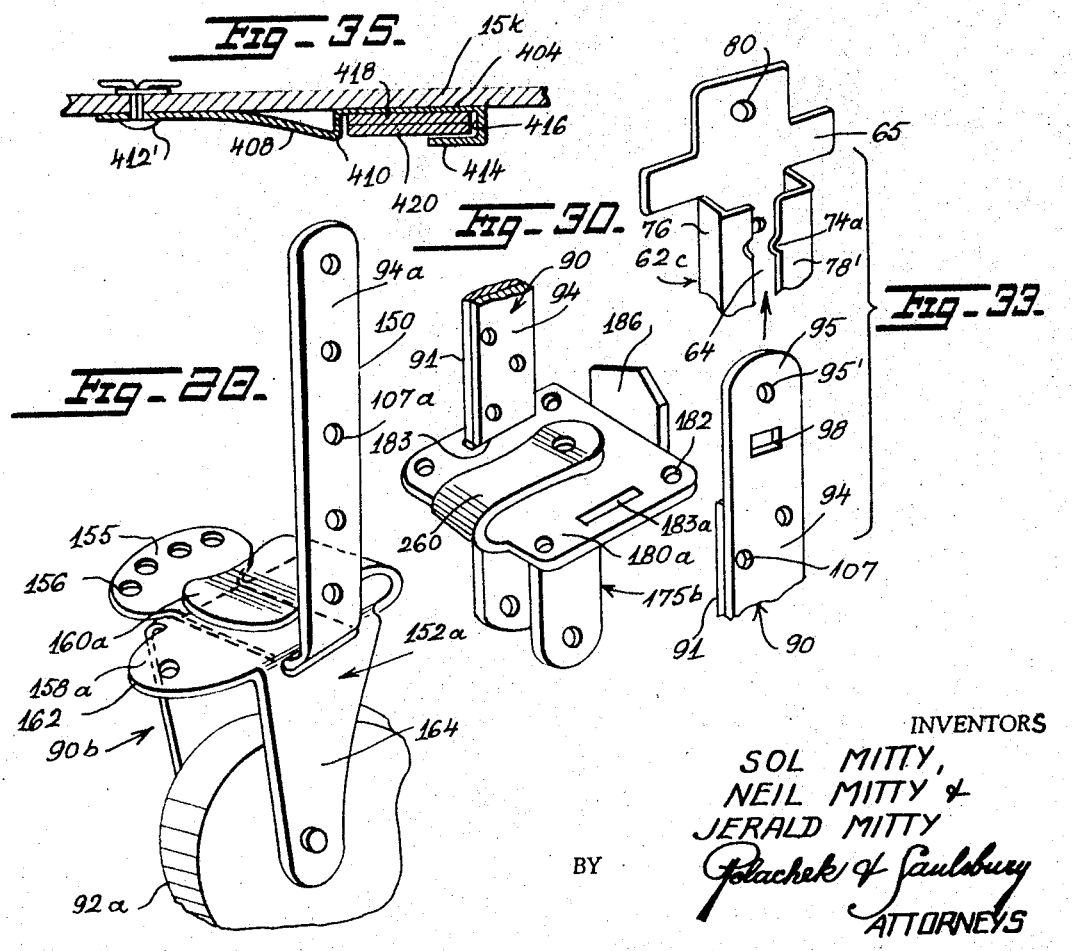

3,462,171
RETRACTABLE WHEEL BRACKETS FOR CORRUGATED SHIPPING CARTONS AND SHOPPING CARTS
Sol Mitty, Neil Mitty, and Jerald Mitty, all of 144—45 78th Ave. Flushing, N.Y. 11375
Filed Jan. 18, 1967, Ser. No. 610,060
Int. Cl. B62b 1/04
U.S. Cl. 280—47.26         5 Claims

ABSTRACT OF THE DISCLOSURE

The disclosure described means for converting a corrugated shipping carton to a shopping cart, including interchangeable wheel bracket assemblies of various types and a slide-out handle. One type of wheel bracket assembly has a key bracket which attaches to a side of the carton or which slides into a sleeve attached to the carton. Support plates can be attached to the brackets for supporting heavier loads.

---

The invention concerns improvements over those described in our prior U.S. Patents 3,087,740; 3,279,811 and 3,285,620.

A principal object of the invention is to provide a wheel bracket assembly useful in converting a corrugated carton to a shopping cart.

A second object is to provide a slide-out handle attachable to a corrugated carton and cooperating with a wheel bracket assembly for converting the carton to a shopping cart.

A third object is to provide a wheel bracket assembly for a shopping cart made from a carton, said assembly including a wheel supporting bracket.

A fourth object is to provide a wheel bracket assembly for a shopping cart made from a carton, the assembly having a wheel supporting bracket and means for mounting the bracket to a bottom corner of the carton either inside or outside the carton.

A fifth object is to provide a wheel bracket assembly shopping cart made from a carton, the assembly having a wheel supporting bracket, with a sleeve inside the cart holding the wheel supporting bracket in position at a bottom rear corner of the cart.

A sixth object is to provide a wheel bracket assembly for a shopping cart made from a carton with means inside the carton for holding a wheel supporting bracket in a retracted position inside the carton and permitting the wheel supporting bracket to be withdrawn from the carton.

A seventh object is to provide a wheel bracket assembly for a shopping cart made from a carton, with a wheel supports bracket, and with a support plate having prongs and/or engaged with the carton.

An eighth object is to provide a wheel bracket assembly for a shopping cart made from a carton, wherein the assembly includes a wheel support bracket attached by a clip and fasteners to the carton.

A ninth object is to provide a wheel bracket assembly for a shopping cart wherein the wheel support bracket is adapted to support two wheels.

A tenth object is to provide a sleeve as part of a wheel bracket assembly for a shopping cart made from a carton, wherein the sleeve is made of corrugated cardboard strips, or is a channel shaped member made of metal or plastic material.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a corrugated cardboard shipping carton set up for making a shopping cart.

FIG. 1A is an enlarged fragmentary sectional view taken on line 1A—1A of FIG. 1.

FIG. 2 is an enlarged fragmentary perspective view of a bottom corner of the carton of FIG. 1, showing parts of a retracted first wheel bracket assembly.

FIG. 3 is an enlarged perspective view of an inside corner of the carton of FIG. 1, with the wheel bracket assembly in an extended position.

FIG. 4 is a vertical sectional view taken on line 4—4 of FIG. 3.

FIG. 5 is a perspective view of a carton set up to serve as a shopping cart, part being broken away to show portions of wheel bracket assembly.

FIG. 6 is a view similar to FIG. 4, but taken on line 6—6 of FIG. 5 with the wheel bracket assembly shown in operating position.

FIG. 7 is a perspective view of a first sleeve unit employed as part of the first wheel bracket assembly.

FIG. 8 is a perspective view of a key-type wheel bracket and associated parts, employed in the first wheel bracket assembly.

FIG. 9 is a plan view of a slide-out handle in open unassembled form.

FIG. 10 is an enlarged perspective view similar to a part of FIG. 3, but showing a second wheel bracket assembly in retracted position, inside a corner of another carton.

FIG. 11 is a fragmentary perspective view similar to FIG. 2, but showing the wheel bracket assembly of FIG. 10 in retracted position.

FIG. 12 is a perspective view of a second sleeve unit.

FIG. 13 is a fragmentary perspective view of the inside corner of another carton showing a third sleeve unit and part of an associated key-type wheel bracket.

FIG. 14 is a perspective view of a third wheel bracket assembly.

FIG. 15 is a vertical sectional view taken on line 15—15 of FIG. 14.

FIG. 15A is a reduced fragmentary perspective view of a bottom rear corner of a carton with the third wheel bracket assembly mounted thereto.

FIG. 16 is a perspective view of a fourth wheel bracket assembly and part of a side wall of a carton.

FIG. 17 is a top plan view of a support plate employed in the assembly of FIG. 16.

FIG. 18 is a perspective view of an outside bottom rear corner of a carton with the fourth wheel bracket assembly mounted thereon.

FIG. 19 is a fragmentary vertical sectional view taken on line 19—19 of FIG. 18.

FIG. 20 is an exploded perspective view of parts of the fourth wheel bracket assembly.

FIG. 21 is a fragmentary perspective view of a bottom rear outside corner of a carton with a fifth wheel bracket assembly mounted thereon.

FIG. 22 is a perspective view on an enlarged scale of a clip employed in the fifth assembly of FIG. 21.

FIG. 23 is a perspective view of part of an inside bottom rear corner of a carton with a sixth wheel bracket assembly mounted thereon.

FIG. 24 is an exploded perspective view of parts of the sixth wheel bracket assembly.

FIG. 25 is a perspective view of a part of a seventh wheel bracket assembly.

FIG. 26 is a reduced fragmentary sectional view taken on line 26—26 of FIG. 25.

FIG. 27 is a reduced perspective view of an outside rear bottom corner of a carton with the seventh wheel bracket assembly mounted thereon.

FIG. 28 is a perspective view of parts of an eighth wheel bracket assembly.

FIG. 29 is a side elevational view of part of the assembly of FIG. 28.

FIG. 30 is a perspective view of part of a ninth wheel bracket assembly.

FIG. 31 is a reduced rear view of part of a bottom rear corner of a carton with the ninth wheel bracket assembly mounted thereon.

FIG. 32 is a reduced perspective view of a tenth wheel bracket assembly employing two wheel support brackets.

FIG. 33 is a fragmentary exploded perspective view of parts of an eleventh wheel bracket assembly.

FIG. 34 is a perspective view of part of a bottom rear inside corner of another carton with a twelfth wheel bracket assembly mounted thereon.

FIG. 35 and FIG. 36 are sectional views taken on lines 35—35 and 36—36 of FIG. 34.

Referring first to FIGS. 1–6 there is shown a rectangular corrugated cardboard carton 10 having vertical front and rear walls 11, 12, opposing vertical side walls 15, a bottom wall 16 having front and rear panels 17, 18 sealed by adhesive tape 19, and a top formed by front and rear flaps 20, 21 and a side flaps 22. Slots 23 are cut in top flap 20, front wall 11 and side walls 15 to define flaps 24. These flaps can be folded inwardly or outwardly to open elongated holes 25 which serve as hand grips at the sides and front of the carton near its open upper end as clearly shown in FIG. 5.

At fold 26 between flap 21 and rear wall 12 is a centrally located slot 28. A handle 30 is located just below this slot. The handle has an upper rectangular portion 32 and a lower broader portion 34. Wings 36 of the broader portion engage under the fold 26 when the handle is pulled up so that the upper portion 32 extends out of the slot 28. Vertical spaced slots 37 are formed in the broader lower portion 34 of the handle these slots are slidably engaged with pins 38 which extend through holes 39 in the rear wall 12; see FIG. 1A. The handle is guided by the pins so that it remains in alignment with the slot 28 and is easily pushed down or pulled up. A hand hole 40 is formed near the upper end of the handle. A loop of tape 42 can be engaged in holes 40 to extend out of slot 28 so that the handle can be pulled up easily.

FIG. 9 shows a blank 50 from which handle 30 can be made. This blank has a rectangular central panel 32' which can be folded on central transverse line 52. At opposite ends of panel 32' are two broader panels 34' each formed with parallel slots 37. Holes 40 are formed in panel 32' on opposite sides of line 52. At inner ends of wings 36 of panels 34' are notches 54. These notches engage with ends of slot 28 in the fold 26 of the carton for retaining the handle in an extended position as shown in FIG. 5. When blank 50 is folded on line 52 the handle 34 is formed as a double layer. Holes 40 register with each other as do slots 37 and notches 54. If only a single layer handle is desired, the blank can be cut along line 52 to form two separate handles 30 from the one blank 50. The handle 30 serves as a convenient hand grip in converting carton 10 to serve as a shopping cart, tote wagon or the like.

Two wheel bracket assemblies 60 are provided at opposite rear bottom corners of the carton. The assemblies 60 are alike so only one of these need be explained in detail. Each assembly 60 includes a channel shaped sleeve 62 having a back or outer side wall 64 formed with two lateral tabs 65 at its upper end; see FIGS. 3 and 7. These tabs can be engaged by staples or straps 66 to a side wall 15 of the carton. Further tabs 68 can be provided near the center of the sleeve 66 and secured by further staples 70. Thus the back wall 64 lies flat against the inner side of the side wall of the carton. A slot 72 extends upwardly from the bottom edge of back wall 64. Just above this slot is projection 74 extending inwardly of the narrow passage defined by the back wall 64, narrow edges of slot 72 and narrow front flanges 78. Flanges 78 have wider upper ends 78'. A hole 79 may be provided near the upper end of the wall 64 just inside flange ends 78' and another hole 80 may be provided at the upper end of wall 64. A slot 82 is cut in each of side walls 15 extending upwardly from its bottom edge and registering with the slot 72 in back wall 64 of the sleeve 62.

When the carton 10 is in the closed arrangement shown in FIGS. 1–4, each wheel bracket assembly 60 has a retracted wheel bracket 90 supporting a rotatable wheel 92. Wheel bracket 90 as clearly shown in FIGS. 3, 4, 6 and 8 has a flat elongated back wall 91 and a flat elongated front wall 94. Wall 94 is welded or otherwise secured to wall 91. Wall 94 has an upper end portion 95 extending upwardly beyond the upper end of wall 92. Rectangular hole 98 is formed in wall end 95 to engage with projection 74 of sleeve 62. A hole 95' in the end portion 95 of wall 94 registers with hole 79 in sleeve wall 64. Wall 91 terminates just below hole 98. Wall 94 is formed with an inwardly extending horizontal step or ledge 100 from the inner edge of which extends vertical flange 102 parallel to the lower end portion 101 of wall 91. Notches 103 are formed at bend 105, at the bottom end of wall 91. Flange 102 and the lower end of wall 94 define a pair of flat parallel legs to support wheel 92. Aligned holes 104 in the legs receive a thumb screw 106 engaged by a nut 108. Screw 106 serves as an axle for the wheel. The head 110 of the screw extends out through slot 82 in the side wall of the carton. A rectangular hole 112 is cut at each outer corner in panel 18 of the carton bottom. The length of this hole is slightly larger than the diameter of wheel 92 and its width is slightly larger than the width of the wheel bracket between outer sides of flange 102 and wall end portion 101. A series of spaced holes 107 is provided near each edge of bracket 90 in walls 91, 94.

As clearly shown in FIGS. 2, 3 and 4, the wheel bracket 90 with wheel 92 attached can retract fully inside the carton. Step 100 and flange 102 extend inside the carton. The back wall 91 abuts back wall 64 of sleeve 62. Step 100 clears flanges 78 of the sleeve at notches 103. The abutted walls 91, 94 serve as a key slidably fitted in the sleeve 62. When the wheel bracket is fully retracted it is frictionally engaged in the sleeve. At projection 74, back wall 64 will flex slightly outwardly to permit sliding of the wheel bracket while keeping a good frictional grip on wall 91. Thus the wheel bracket cannot accidentally slip out of the sleeve. The head 110 of the screw which projects outwardly of slot 82 is grasped for pulling the wheel and wheel bracket down out of the carton. When the wheel and wheel bracket are fully clear of the carton, they can be turned around and the wheel bracket will then be reinserted in the sleeve. Now, as shown in FIGS. 5 and 6, step 100 underlays the lower end of the sleeve wall 64 and serves as an abutment to support the carton. Projection 74 engages in hole 98 of bracket wall 94. The wheel assemblies are thus completed and in operative position. The carton is thus converted to a shopping cart as shown in FIG. 5, with handle 30 extended along with the wheels 92, all at the back of the carton. If desired a cotter pin or bifurcated paper fastener 115 can be inserted through a hole 116 formed in the side of the carton and through registering holes 79, 95' in wall 64 of the sleeve and wall 94 of bracket 90. This will effect a more secure locking of the wheel bracket in the sleeve. A rivet or the like can be inserted in hole 80 of sleeve wall 64 to cooperate with staples 66, 70.

The wheel assemblies are rather compact in construction so that the carton 10 can be shipped in substantially flat collapsed form with the wheel assemblies wholly contained within the carton. If desired, the carton can be shipped with only the sleeves 62 in place and the wheel brackets and wheels can be packed separately. In any case, the carton is readily set up without use of any tools or any particular mechanical skill, at a food market or other shopping center for immediate use by a shopper in carting off purchases in the cart.

FIGS. 10 and 11 show a modification of the mounting for wheel 92 in which the thumb screw 106 is replaced by a screw 106a having a flat head 110a. A short cord 117 can be attached to the shank of the screw to project out of hole 112 in the bottom of the carton 10a. By this arrangement, the slots 82 in the side walls 15 of the carton 10 can be omitted in carton 10a as shown by the unslotted bottom corner of wall 15a in FIG. 11. Parts of wheel 92 and flange 78 are broken away in FIG. 10 to show the flat head 110a of the screw and the attached cord 117.

FIG. 12 shows another sleeve construction for use as part of a non-retractable wheel bracket assembly to replace sleeve 62. Sleeve 62A is generally similar to sleeve 60 with a back wall 64a provided with holes 79, 80, and projection 74. The tabs 65 and 68 of sleeve 60 are omitted and instead a turned up back flange 120 is provided at the lower end of back wall 64a. This ledge will be engaged under the free edge of a side wall of the carton at hole 112. A strap or staple 122 around walls 76a and flanges 78a will hold the sleeve to the side wall of the carton, or a cotter pin 124 can be engaged in hole 80. The sleeve 62a receives the wheel bracket 90 in the same manner as described in connection with FIGS. 1–8 to hold the wheel in place under the shopping cart.

FIG. 13 shows a sleeve 62b which can be provided in place of sleeves 62 or 62a for use with non-retractable wheel assemblies. This sleeve is made from a plurality of corrugated cardboard strips 125–128. Narrow strips 126, 127 are inside of wider strips 125, 128 and are spaced apart to define a passage 130 which receives walls 91, 94 of wheel bracket 90. Staples 132 can be used to secure the sleeve to side walls 15b of the carton 10b. Only a narrow hole 112′ need be provided at the bottom panel 18′ of the carton since the wheel assembly is not retractable in this arrangement. Cotter pins or fasteners 134 can be inserted through the edges of the sleeve 60b, through holes 107 in the wheel bracket and through wall 15b to retain the wheel bracket in the sleeve.

FIGS. 14, 15 and 15A show a wheel bracket assembly 90a intended for supporting a nonretractable wheel 92a. Bracket assembly 90a includes two basic parts, an L-shaped bar 150 and an inverted generally U-shaped wheel carrier plate 152. Bar 150 has an upright elongated wall 94a provided with a row of centrally located holes 107a. Extending forwardly from the lower end of wall 94a is a flange 154 terminating in a tab 155 having a plurality of holes 156. The wheel carrier 152 has a flat top plate 158 from one end of which extends upwardly a flange 160 provided with a hole 161. Another hole 162 is provided in the laterally extended other end of top plate 158. Depending from opposite long edges of plate 158 are two flat parallel generally triangular flanges 164 defining legs between which wheel 92a is rotatably mounted. A screw 106a extends through holes 166 near the lower ends of flanges 164. Nut 108a is engaged on the threaded end of the screw which serves as an axle for the wheel. Flange 154 extends through slots 167 at upper end of flanges 164.

Bracket 90a is to be mounted to a corner of a carton 10c which has no large hole like hole 112 in its bottom panel 18c. Wall 94a will abut side wall 15a and flange 160 will abut the rear wall 12c. Tab 156 and plate 158 will underlay the bottom panel 18c. Pins or fasteners 170 will be inserted through holes 107a, 156, 161, 162 into the three corner walls of the carton to hold the bracket in position on the outside of the carton. Brackets 90a will be provided for shopping carts which are to carry heavier loads than intended for the wheel bracket assembly 60 of FIGS. 1–8 assemblies previously described.

In FIGS. 16–20 is shown a bracket assembly 175 imploying a support plate 180 in association with wheel support bracket 90. Plate 180 is generally rectangular with rounded corners and holes 182 near the corners. Near one edge of the plate is an elongated narrow slot 183 which receives the walls 91, 94 of bracket 90. The plate overlays step 100 in a horizontal position. Three flat, pointed prongs 185, 186 and 187 extend upwardly from the three other edges respectively of plate 180. When the assembly 175 is mounted to a rear bottom corner of carton 10d as shown in FIGS. 18 and 19, wall 94 will abut wall 15d and the thin upper end 95 of wall 95 will be inserted through a slot 190 formed in wall 15d. One prong 185 or 187 abuts rear wall 12d of the carton. The plate 180 underlays the bottom panel 18d of the carton and prongs 186 and 187 (or 185) pierce through this bottom panel. Cotter pins or fasteners 192 are inserted through some of holes 95, 107, and 182 and secure the assembly 175 to one outside bottom rear corner of the carton. A similar assembly (not shown) will be secured to the other bottom rear corner of the carton. The upper edge of wall 91 may engage the upper edge of slot 190 in supporting relation with wall 15d.

FIG. 21 shows bracket assembly 175A arranged somewhat like assembly 175 shown in FIG. 18, with the assembly on an outside bottom rear corner of carton 10e. The slot 190 of carton in wall 15d is omitted, and instead the wall 94 of bracket 90 is entirely outside the carton abutting side wall 15e. A staple 191 secures upper portion 95 of wall 94 to side wall 15e. The support plate 180 underlays the bottom of the carton in the same manner as shown in FIGS. 18 and 19, with two prongs pierced through the bottom of the carton. One prong 185 or 187 abuts the rear side 12e of the carton. A U-shaped clip 197 formed with a sharp point 193 will pierce the rear side wall 12e near the intersection with side wall 15e. The other arm 194 of the clip engages around walls 91 and 94 of bracket 90. If desired fasteners 192 can be inserted in holes 107 of the bracket as well as in the holes in the support plate under the carton. Another similar assembly will be attached at the other bottom rear corner of the carton.

FIGS. 23, 24 show another bracket assembly 200 which makes use of support plate 180 similar to plate 180 but with a wider slot 183′. This assembly includes wheel support bracket 202 which has an outside elongated straight wall 204 abutting inside wall 206. Wall 206 has an offset upper end 208 which engages in slot 210 formed in side wall 15f of carton 104. A knob 212 is formed at an intermediate point of wall 206. This knob engages in a hole 214 formed in side wall 15f below slot 210. A flange 216 is secured to wall 206 and abuts step 100a. Flange 216 has an upturned flat pointed prong which penetrates the bottom 18e of the carton near wall 15f. Two prongs of support plate 180′ also penetrate the bottom of the carton. Supplementary fasteners can be provided, inserted through holes 182 in plate 180, but in general they will not be required since the assembly 200 will be effectively locked in position at an outside bottom corner of the carton. The corner of the carton rests on support plate 180 as well as on step 100a which extends laterally from the bottom end of wall 206. Flange 102a and the lower end wall portion 204′ support wheel 92e rotatably therebetween. The wheel rotates on screw 212 engaged in holes 104e of flange 102a and wall portion 204′.

FIGS. 25, 26 and 27 show another bracket assembly 250 which is a one piece structure made of plastic material. This assembly has support plate 252 integral with vertical wall 254 and provided with a plurality of prongs 255. Wall 254 has holes 256 to receive pins 257 which secure the assembly to side wall 15g of carton 10g while prongs 255 pierce the bottom of the carton. Spaced parallel flanges 258 rotatably support wheel 92f. Two identical assemblies will be secured to opposite outside bottom rear corners of the carton.

FIGS. 28, 29 show a bracket assembly 90b, which is generally similar to assembly 90a of FIG. 14. Corresponding parts are identically numbered. The assembly includes L-shaped bar 150 engaged with a modified form of wheel carrier plate 152a. This plate is like plate 152 except that a folded tongue 160a replaces the flange 160 of plate 152. This tongue will engage over a folded panel at the bottom of the carton while plate 158a underlays the bottom of the carton at a bottom rear outside corner. Suitable fasteners can be inserted through holes 107a, 156 and 162 to hold the assembly securely to the corner of the carton. Another similar assembly will be attached to the other rear outside bottom corner of the carton.

FIGS. 30, 31 show another bracket assembly 175B which is like assembly 175A of FIG. 21 and corresponding parts are identically numbered. In assembly 175B the support plate 180a has a single prong 186 to pierce the bottom of carton 10h and opposite this prong is a bent over tongue 260. This tongue engages over folded flap or panel 18″ at the bottom of the carton. Two slots 183 and 183a are provided near opposite edges of the plate so that walls 91, 94 of bracket 90 can be inserted into either slot, depending on which of the bottom rear outside corner of the carton supports the assembly. Staple 191 and clip 197 can be used to attach the bracket 90 to the side wall 15h of the carton.

FIG. 32 shows a bracket assembly 300 which employs a bracket 302 where very heavy loads are to be supported. This bracket has a vertical wall 304 provided with holes 305 to receive fasteners and prongs 307 to penetrate the rear wall of a carton. The bracket has an integral horizontal wall 308 provided with vertical prongs 310 to penetrate the bottom of the carton. Two wheel carrier plates 152a, 152a′, of the type shown in FIG. 28 are mounted on wall 308 by engaging their tongues 168a thereover. By this arrangement two wheels 92 can be provided at each of the two bottom rear corners of the carton. Wall 304 will abut the rear wall of the carton.

FIG. 33 shows bracket assembly which is generally similar to assembly 60 of FIG. 3 and corresponding parts are identically numbered. Sleeve 62c is provided with inwardly extending projections 74a on flanges 78′. These projections engage in hole 98 of bracket 90 to hold the bracket in the sleeve.

FIGS. 34–36 show another wheel bracket assembly 400 which has a bracket 402 including a plate 404 formed with a lateral V-cut or notch 406. The bottom portion 408 of the plate is bent outwardly below the notch to form a ridge 410. Fasteners 412 secure the bracket 402 to side 15k of carton 10k. A hook 413 at the bottom of plate 404 engages under wall 15k. A flange 414 is formed at one end of plate 404 and is bent around parallel to the plate to define a vertical groove 416. Pivotally disposed in the groove are abutted walls 418, 420 of a wheel bracket 425. This bracket supports wheel 92k rotatably between flange 426 and the bottom end of wall 418. Flange 426 is offset from the plane of plate 420. Bracket 425 swings in a vertical plane around screw 430 which engages the upper ends of walls 418, 420 in groove 416. The wheel rotates on screw 106. The head 110 of this screw extends outwardly and moves in an accurate slot 432 formed in side wall 15k of the carton. A large rectangular hole 112k is formed in the bottom panel 18k of the carton to allow pivotal movement of the bracket 425 and wheel 92k. By the arrangement described, the wheel and bracket can be swung between a horizontal position inside the carton to an extended position shown in FIGS. 34, 36. When the wheel and bracket are turned downwardly the walls 418, 420 snap past the ridge 410 so that the bracket is locked in position. This engagement is clearly shown in FIG. 35.

According to the invention, there have now been described various wheel bracket assemblies for converting an ordinary corrugated cardboard carton to a shopping cart. The wheel bracket assemblies can be mounted either inside or outside the carton or partially inside and partially outside the carton at bottom rear corners thereof. The wheel brackets can be retractable inside the carton or can be mounted in fixed positions to the carton.

The wheel brackets can be made of metal or plastic material. The showing of metal or plastic members in the drawings is only by way of example, and it will be understood that plastic or metal respectively can be employed instead. Bracket 90 can be made of one piece of plastic for example instead of two individual metal members 91 and 94. Other two or three piece brackets can be made as one piece plastic moldings if desired.

While I have illustrated and described the preferred embodiments of my invention, it is to be understood that I do not limit myself to the precise construction herein disclosed.

What is claimed is:

1. Means for converting a rectangular corrugated cardboard carton to a shopping cart, comprising a wheel bracket assembly for each bottom rear corner of the carton defined by side, rear and bottom walls of the carton, said assembly comprising a wheel bracket having a flat horizontal portion for underlaying and supporting the bottom wall of the carton; a pair of lower vertical flat parallel legs depending from the horizontal portion for rotatably supporting a wheel therebetween; and an upper vertical flat portion extending upwardly from the horizontal portion and attachable to a side wall of the carton, said wheel bracket assembly further comprising an elongated generally rectangular sleeve attachable to a side wall of the carton, said sleeve having a narrow passage for receiving the upper vertical portion of the wheel bracket, said vertical flat portion being an extension of and co-planar with one of said lower parallel wheel receiving legs, said vertical flat portion being receivable in said sleeve; and means for retaining the vertical flat portion in the narrow passage.

2. Means as recited in claim 1, wherein said sleeve is made of a plurality of corrugated cardboard strips.

3. Means as recited in claim 1, wherein said sleeve is a channel shaped member with a flat back wall attachable in a vertical position to a side wall of the carton, narrow other walls extending outwardly of said flat back wall, and a pair of narrow flanges spaced from said flat back wall, said upper vertical portion of the wheel bracket being slidable upward in said sleeve to retract said legs and the wheel carried thereby into the carton through a hole in the bottom thereof, whereby said wheel bracket can be pulled out of the sleeve, turned around and reinserted into the sleeve so that the horizontal portion of the wheel bracket abuts the bottom end of the flat back wall and narrow other walls of the sleeves, with the legs of the wheel bracket extending downwardly from the bottom of the carton.

4. Means as recited in claim 3, wherein said sleeve has a projection extending inwardly of said passage, and wherein the upper portion of the wheel bracket has an opening, said projection being engageable in said opening for holding the wheel bracket engaged with the sleeve.

5. Means as recited in claim 3, further comprising an element attached to the carton by the wheel bracket and extending outwardly thereof, whereby said element can be grasped for pulling the wheel bracket out of the carton through the hole in the bottom when the wheel bracket is fully retracted into the carton.

References Cited

UNITED STATES PATENTS

| 2,834,608 | 5/1958 | Wixson | 280—150 |
| 2,925,283 | 2/1960 | Stilger | 280—37 |
| 3,057,636 | 10/1962 | D'Ettorre et al. | 280—37 |
| 3,087,740 | 4/1963 | Mitty et al. | 280—47.26 |
| 3,178,197 | 4/1965 | Boatner | 280—37 |
| 3,292,942 | 12/1966 | Mitty et al. | 280—47.26 |

BENJAMIN HERSH, Primary Examiner

JOEL E. SIEGEL, Assistant Examiner

U.S. Cl. X.R.

280—37, 43